United States Patent
Leopold et al.

(10) Patent No.: US 9,286,628 B2
(45) Date of Patent: *Mar. 15, 2016

(54) CONTROL DEVICES AND METHODS FOR A ROAD TOLL SYSTEM

(71) Applicant: Kapsch TrafficCom AG, Vienna (AT)

(72) Inventors: Alexander Leopold, Vienna (AT); Joachim Bäck, Vienna (AT); Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 255 days.

This patent is subject to a terminal disclaimer.

(21) Appl. No.: 13/757,514

(22) Filed: Feb. 1, 2013

(65) Prior Publication Data

US 2013/0201038 A1    Aug. 8, 2013

(30) Foreign Application Priority Data

Feb. 2, 2012  (EP) .................................... 12153628

(51) Int. Cl.
*G08G 1/01* (2006.01)
*G06Q 30/02* (2012.01)
(Continued)

(52) U.S. Cl.
CPC .............. *G06Q 30/0283* (2013.01); *B60Q 9/00* (2013.01); *G07B 15/06* (2013.01); *G07B 15/063* (2013.01);
(Continued)

(58) Field of Classification Search
CPC . G06Q 30/0283; G07B 15/06; G08G 1/0137; G08G 1/0175; G08G 1/052; G08G 1/202; G08G 1/205
USPC .............. 340/989, 902, 928; 382/105; 705/13
See application file for complete search history.

(56) References Cited

U.S. PATENT DOCUMENTS 5,705,996 A * 1/1998 Eguchi et al. ................. 340/928
6,734,787 B2 * 5/2004 Ikeda ......................... 340/425.5
(Continued)

FOREIGN PATENT DOCUMENTS

DE         3932029       6/1990
DE      102005058033    6/2007
(Continued)

OTHER PUBLICATIONS

Machine Translation, European Patent Publicatiuon: Erker-EP1783692A2-Description portion, Oct. 30, 2014.*
(Continued)

*Primary Examiner* — Fekadeselassie Girma
*Assistant Examiner* — Stephen Burgdorf
(74) *Attorney, Agent, or Firm* — Fiala & Weaver P.L.L.C.

(57) ABSTRACT

Control devices and methods for a road toll system that is based on on-board units carried by vehicles, using at least one recording vehicle and at least one control vehicle, which communicate with a central violation server, wherein the recording vehicle reads out a toll parameter from the on-board unit of a passing vehicle via a DSRC radio interface, compares it to a shape parameter of the vehicle detected by a sensor, and based thereon, in case of inconsistency, generates a violation data record and transmits it to the violation server, wherein the control vehicle registers the position or surroundings thereof in the violation server, and the violation server makes available to this control vehicle those violation data records, the locations of the violations of which are within the surroundings of a position of a control vehicle, and wherein the control vehicle issues an alert message when it detects a violating vehicle in the surroundings thereof.

24 Claims, 5 Drawing Sheets

(51) Int. Cl.
*G08G 1/017* (2006.01)
*G07B 15/06* (2011.01)
*B60Q 9/00* (2006.01)
*G08G 1/015* (2006.01)
*G08G 1/054* (2006.01)
*G08G 1/00* (2006.01)
*G08G 1/052* (2006.01)

(52) U.S. Cl.
CPC ............. *G08G 1/015* (2013.01); *G08G 1/0137* (2013.01); *G08G 1/0175* (2013.01); *G08G 1/052* (2013.01); *G08G 1/054* (2013.01); *G08G 1/202* (2013.01); *G08G 1/205* (2013.01)

(56) References Cited

U.S. PATENT DOCUMENTS

| | | | |
|---|---|---|---|
| 7,382,275 B2 * | 6/2008 | Feldman et al. | 340/904 |
| 7,602,485 B2 * | 10/2009 | Mori | 356/239.2 |
| 8,384,560 B2 * | 2/2013 | Malarky | 340/928 |
| 2006/0064345 A1 | 3/2006 | Biet | |
| 2006/0142933 A1 | 6/2006 | Feng | |
| 2007/0029825 A1 * | 2/2007 | Franklin et al. | 293/128 |
| 2007/0208681 A1 * | 9/2007 | Bucholz | 706/47 |
| 2008/0238719 A1 * | 10/2008 | Marchasin et al. | 340/901 |
| 2013/0073347 A1 * | 3/2013 | Bogaard et al. | 705/13 |

FOREIGN PATENT DOCUMENTS

| | | |
|---|---|---|
| EP | 1170702 | 1/2002 |
| EP | 1783692 | 5/2007 |
| WO | 2004027730 | 4/2004 |
| WO | 2011103612 | 9/2011 |
| WO | 2011129800 | 10/2011 |

OTHER PUBLICATIONS

Australian Government Patent Examination Report No. 1, including Search Information Statement, Australian Application no. 2013200478, Kapsch TrafficCom AG, Nov. 11, 2013.
Australian Government, Patent Examination Report No. 1, AU App. No. 2013200444, report dated Nov. 8, 2013.
Extended European Search Report mailed Mar. 4, 2013 from the European Patent Office.
Extended European Search Report mailed Mar. 5, 2013 from the European Patent Office.
Extended European Search Report dated Jun. 15, 2012 from the European Patent Office.

* cited by examiner

CONTROL DEVICES AND METHODS FOR A ROAD TOLL SYSTEM

CROSS REFERENCE TO RELATED APPLICATIONS

The present application claims the priority of the European patent application no. 12153628.8 filed Feb. 2, 2012, which is hereby incorporated by reference herein.

FIELD OF THE INVENTION

The present invention relates to control devices and methods for a road toll system which is based on on-board units carried by vehicles. In modern road toll systems, vehicles subject to tolls are equipped with on-board units (OBUs), which can be used to locate the vehicles so as to then charge tolls (fees) for their usage of the road. The OBUs can take on a variety of designs: The OBUs can be of the "self-locating" type, which is to say, they can continually determine the locations thereof themselves, for example by means of a satellite navigation receiver as part of a satellite navigation system (global navigation satellite system, GNSS) and report the locations thus determined ("position fixes") either directly to a back office of the road toll system, be it via a mobile communication network or a network of geographically distributed radio beacons, or in the form of "abstracted" toll transactions, which are calculated based on the reported positions. As an alternative, such GNSS OBUs could simply store the reported positions or toll transactions thereof, or debit the fees calculated based thereon from an internal toll credit account. The OBUs can also be of the "externally located" type, for example using a plurality of toll or radio beacons that are geographically distributed over the road toll system and which establish the respective short range communication or DSRC (dedicated short range communication) with passing OBUs and localize them with respect to the known beacon locations thereof due to the limited communication range. Corresponding reported positions, or toll transactions calculated based thereon, can then be generated by the OBUs or the toll beacons and processed either in the OBUs or in the back office.

SUMMARY

Various embodiments described herein are directed to control devices and methods for ascertaining and enforcing traffic or toll violations in such road toll systems.

Some embodiments include a control device of the type mentioned above, comprising: at least one recording vehicle and at least one control vehicle, which each comprise a read unit for reading the license plate number of a license plate of the vehicle and are wirelessly connected to a central violation server, wherein the recording vehicle is configured to detect a traffic or toll violation of an on-board unit, or of a vehicle carrying the same, and, if a violation exists, to transmit a violation data record, including the location of the violation and the license plate number read result of the vehicle, to the violation server, wherein the violation server is configured to register control vehicles, including the positions or the surroundings thereof, and to provide violation data records, the locations of the violations of which are within the surroundings of a position, to a control vehicle that is registered with this position or these surroundings, and wherein the control vehicle is configured to register the position or surroundings thereof in the violation server and to determine a violation data record that has been provided by the violation server for a read license plate number and, if such a record exists, to issue an alert message.

Further embodiments relate to recording vehicles, violation servers and control vehicles, which are characterized by the aforementioned components and functionalities.

Still further embodiments relate to a control method in a road toll system which is based on on-board units carried by vehicles, using at least one recording vehicle and at least one control vehicle, which can wirelessly communicate with a central violation server, the method comprising: in the recording vehicle: detecting a traffic or toll violation of an on-board unit or of a vehicle carrying the same, and if a violation exists, transmitting a violation data record, containing a determined location of the violation and a read license plate number of the vehicle, to the violation server; in the violation server: registering control vehicles, including positions or the surroundings thereof, receiving violation data records from recording vehicles and, if the locations of the violations thereof are within the surroundings of a position, providing these violation data records to a control vehicle that is registered with this position or these surroundings; in the control vehicle: registering the position or surroundings thereof in the violation server, reading the license plate number of a license plate of a passing vehicle, determining a violation data record provided by a violation server for a read license plate number and, if such a record exists, and issuing an alert message.

Various embodiments as described herein may include a distributed control system, which comprises a first fleet of recording vehicles ("hunters") and a second fleet of control vehicles ("catchers"), which communicate with each other via a common violation server. The "hunters" are well-equipped for automatic violation detection and in some embodiments are not required to take any further action for violating vehicles than that of generating violation data records; their interactions with the controlled vehicles are brief, and consequently they can move about quickly and even check vehicles traveling at high speed or in opposing traffic, and their number can be kept low, whereby the overall equipment costs are contained. The "catchers" may include comparatively little equipment because they do not ascertain violations, but only read vehicle license plate numbers, search for associated violation data records and issue alerts for violating vehicles. The crew of the control vehicle can then, for example, stop the violating vehicle and conduct a local manual check. Because of the low equipment requirements, control vehicles (catchers) can be provided in large numbers and can thus also specifically conduct time-consuming local inspections. For example, existing fleets of special-purpose vehicles, such as emergency vehicles, means of public transportation, taxis and the like, can be converted into control vehicles and perform the control functions thereof in mobile fashion in moving traffic, and in stationary fashion in stopped traffic, while a few complex recording vehicles (hunters) continually move through moving traffic in a highly mobile fashion and generate violation data records. As a result, automatic controls of on-board units themselves can be carried out even in large, broadly branched road systems that contain high-speed and opposing traffic routes.

The devices and methods described herein are suited both for (DSCR) OBUs of the externally located type that already comprise a DSRC radio interface, and for (GNSS) OBUs of the self-locating type that additionally comprise a DSRC radio interface for control and setting purposes.

The number of control vehicles may be considerably higher than that of recording vehicles, in particular may be higher by at least a power of ten.

The violations detected by the recording vehicle can include all types of toll or traffic violations that can be automatically detected, for example speeding violations detected by means of a speed measuring unit of the recording vehicle, bans on driving (including time-based bans) detected by means of a vehicle detection unit of the recording vehicle, and the like. The violations are preferably toll violations, and in particular such which can be ascertained based on a toll parameter that can be read out from the on-board unit via the DSRC radio interface. Such toll parameters can be arbitrary and provide information, for example, about the deployment purpose of the vehicle (for example emergency vehicle, means of public transportation, private vehicle, truck and the like), the status of the user of the vehicle, the size, weight, emission class, number of axles of the vehicle, or the relationship between the (user-specific) on-board unit and the physical vehicle (referenced via the license plate, for example) and the like. Any time a toll is calculated, be it during communication with a toll beacon or the calculation of toll transactions from reported positions, the toll parameters of the OBU are employed so as to determine the amount of the toll—or whether an obligation to pay the toll even exists.

An embodiment of a system or method may be characterized in that the detection in the recording vehicle takes place by reading out at least one toll parameter from the on-board unit via the DSRC radio interface and checking the toll parameter for accuracy.

In still further embodiments, the system may check vehicle shape-specific toll parameters. Such vehicle shape-specific parameters, which determine the amount of a road toll to be paid, can be, for example, the dimensions of the vehicle, the current number of axles (with or without trailer), a particular body design such as a truck or passenger car, and the like, and can be set or stored as toll parameters in an on-board unit. So as to detect abusive faulty settings of such toll parameters, the recording vehicle comprises a DSRC transceiver for reading out the toll parameter of a passing vehicle and a sensor for detecting a shape parameter of the vehicle, wherein the recording vehicle is configured to verify that the toll parameter is consistent with the shape parameter and, in the case of inconsistency, to transmit the violation data record, including the location of the violation and the license plate number read result of the vehicle, to the violation server.

As an alternative or in addition, the recording vehicle can be equipped with a unit for measuring the speed, and in some embodiments the driving direction of a passing vehicle, so as to also determine the traffic or toll violation based on these measured values.

As described, the detected shape parameter and the read-out toll parameter can be the vehicle length or number of axles, in particular broken down according to classes ("classified"). The shape parameter of a vehicle to be controlled can be detected in a wide variety of ways, for example using an electronic camera containing object recognition software, using a radar detector for vehicle measurement or detection of the wheels of the same, or using a laser rangefinder or laser scanner, which detects at least a portion of the shape of the vehicle by scanning the same as it passes. A 2D or 3D image (profile or "point cloud" of laser distance measurement points) of at least a portion of the vehicle is created by the relative movement between the recording vehicle and the controlled vehicle, and based thereon the shape parameter can be obtained, for example by means of object recognition software, for example as a vehicle length or number of axles, based on which, for example, a conclusion can be drawn of a certain vehicle class (passenger car, truck, truck with trailer, and the like).

The recording vehicle can determine the location of the violation itself, for example by means of a satellite navigation receiver, or receive it directly from the on-board unit that is being checked, for example if the same comprises a dedicated position determination unit or learns of the position thereof in another manner, for example from a stationary radio beacon.

It is particularly advantageous if the recording vehicle is equipped with a unit for measuring the speed, and preferably the driving direction, of a passing vehicle, and adds these measured values to the violation data record. In this case, the violation server can also be configured to extrapolate a temporal change of the location of the violation based on the aforementioned measured values, so as to take this into consideration when checking whether a location of a violation coincides with the surroundings of a position at a particular time. This can increase the likelihood that a violating vehicle will be picked up by a control vehicle, by generating estimations of the movements of the violating vehicles and coordinating them with the positions of the control vehicles.

According to a further embodiment, the violation data record can also contain a time stamp and the violation server can be configured to take only violation data records into consideration that are within a predetermined time period. As an alternative or in addition, the control vehicle can be configured to discard violation data records that have time stamps outside a predetermined time range. This allows old data records to be automatically eliminated.

BRIEF DESCRIPTION OF THE FIGURES

Additional characteristics of the systems and methods described herein will be apparent from the following detailed description, which references the accompanying drawings, in which.

DETAILED DESCRIPTION

Figure 1:
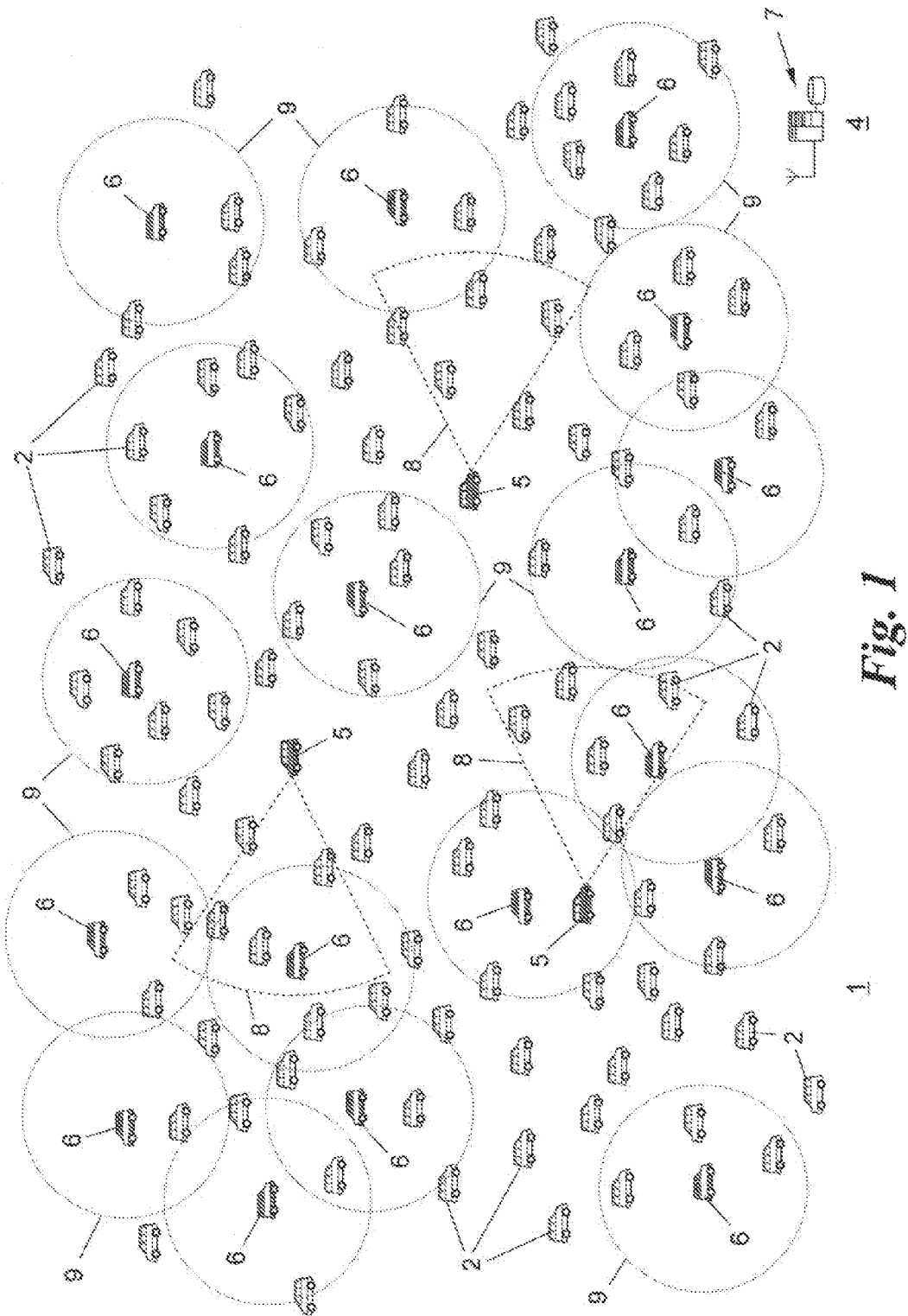
FIG. 1 shows a schematic overview of the operating principle of the control devices and of the control method according to some embodiments in a vehicle population of a road system.

FIG. 1 is a schematic illustration of a road toll system 1, in which a plurality of vehicles 2 that are subject to tolls move about on a road system, which is not shown in detail, for example a nationwide road system. The road toll system 1 is used to charge tolls (fees) for arbitrary road usages by the vehicles 2, and more specifically both usages of traffic areas of moving traffic in form of roadway, territory, passage or border tolls, and of traffic areas of stopped traffic in form of visitation or parking fees.

For this purpose, according to FIGS. 2 and 3 all vehicles 2 that are subject to tolls are equipped with on-board units (OBUs) 3, which can be used to locate the vehicles 2 and consequently they can be charged tolls. The OBUs 3 can take on a variety of designs: The OBUs 3 can be of the "self-locating" type, which is to say, they can continually determine the locations thereof themselves, for example by means of a satellite navigation receiver as part of a satellite navigation system (global navigation satellite system, GNSS) and report the locations thus determined ("position fixes") either directly to a back office 4 of the road toll system 1, be it via a mobile communication network or a network of geographically distributed radio beacons, or in the form of "abstracted" toll transactions, which are calculated based on the reported positions. As an alternative, such GNSS OBUs 3 could simply store the reported positions or toll transactions thereof, or debit the fees calculated based thereon from an internal toll credit account. The OBUs 3 can also be of the "externally located" type, for example using a plurality of toll or radio beacons which are geographically distributed over the road toll system 1 and which establish the respective short range communication or DSRC (dedicated short range communication) with passing OBUs 3 and localize the known beacon locations thereof due to the limited communication range. Corresponding reported positions, or toll transactions calculated based thereon, can then be generated by the OBUs 3 or the toll beacons and processed either in the OBUs 3 or in the back office 4.

So as to correctly calculate the toll in the road toll system 1, one or more toll parameters OC that are specific to the respective vehicle 2 are set or stored in the OBUs 3. The toll parameters OC can be of any arbitrary type and can, for example, provide information about the deployment purpose of the vehicle 2 (for example emergency vehicle, means of public transportation, private vehicle, truck and the like), the status of the user of the vehicle 2, about the size, weight, emission class, number of axles of the vehicle 2 with or without trailer, and the like. Any time a toll is calculated, be it during communication with a toll beacon or the calculation of toll transactions from reported positions, the toll parameters OC of the OBU 3 are employed so as to determine the amount of the toll—or whether an obligation to pay the toll even exists.

Hereafter, toll parameters OC that are considered include those which can be validated (cross-checked) by checking the exterior appearance, which is to say the shape of the vehicle 2 which carries the OBU 3. Such toll parameters OC are referred to herein as vehicle-shape specific. Vehicle shape-specific toll parameters OC can, for example, include one or more dimensions of the vehicle 2, the body design thereof (boxy body, platform body, passenger car or truck body), number of axles, number of trailers, and the like.

The control devices and methods described hereafter are suitable for those OBUs 3, the vehicle shape-specific toll parameters OC of which set or stored therein can be read out via a DSRC radio interface, as is the case, for example, with DSRC OBUs according to the RFID, CEN-DSRC, UNI-DSRC, ITS-G5 or WAVE (wireless access in a vehicle environment) standards. GNSS OBUs 3, which additionally contain a DSRC radio interface for read-out of the toll parameters thereof for control purposes, are also suited and can be checked in the manner described below.

Moreover, the control devices and methods described herein are, of course, also able to ascertain whether a vehicle 2 that is subject to toll is even equipped with an OBU 3 and—since the read-out of toll parameters requires a correctly functioning OBU 3—check the functionality of an OBU 3.

Finally, the described control devices and methods are also able to detect and enforce general traffic violations of the vehicles 2, such as speeding violations, transgressions of (night) driving bans and other traffic offenses, insofar as they can be automatically detected by means of measuring units, sensors and the like.

A control device is used in the road toll system 1 for the aforementioned control purposes, which is composed of a first fleet of recording vehicles 5, a second fleet of control vehicles 6, and a violation server 7 in the back office 4.

In some embodiments a considerably higher number of control vehicles 6 than recording vehicles 5 is provided. The ratio of the number of control vehicles 6 to recording vehicles 5 may be at least 10:1, and possibly 100:1, 1000:1 and more. As will be described below, control vehicles 6 have a simpler design than recording vehicles 5 and are operated with a different movement behavior, which results in a balanced coverage ratio of the spheres of action of recording and control vehicles at minimal costs. The recording vehicles 5 move continually in flowing traffic, and the interactions thereof with the vehicles 2 to be controlled are brief, while the control vehicles 6 can be used both in mobile and in stationary fashion and have longer interactions with the vehicles 2 being controlled if they conduct stop checks or enforce toll violations.

Figure 3A:
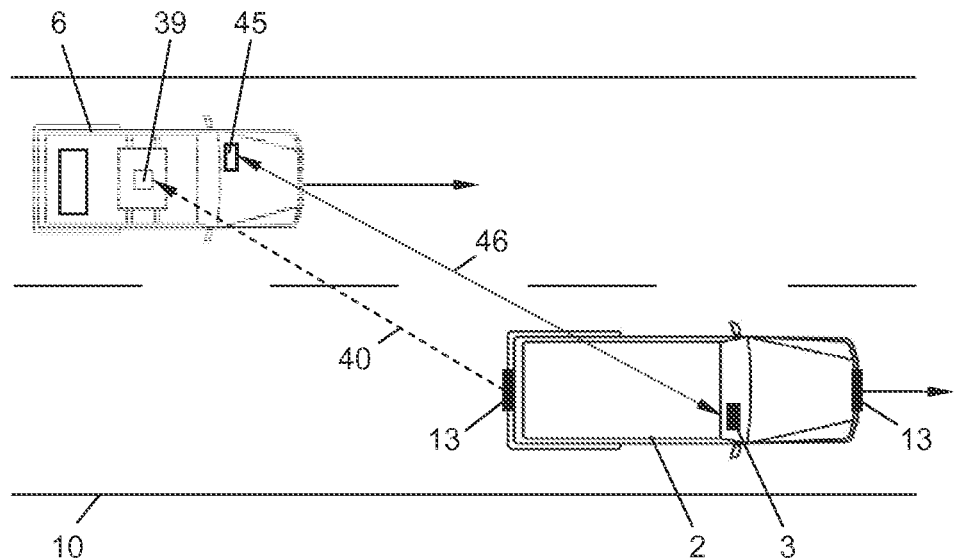
FIGS. 3a and 3b show different device components and method steps when a vehicle to be controlled passes a control vehicle.
Figure 3B:
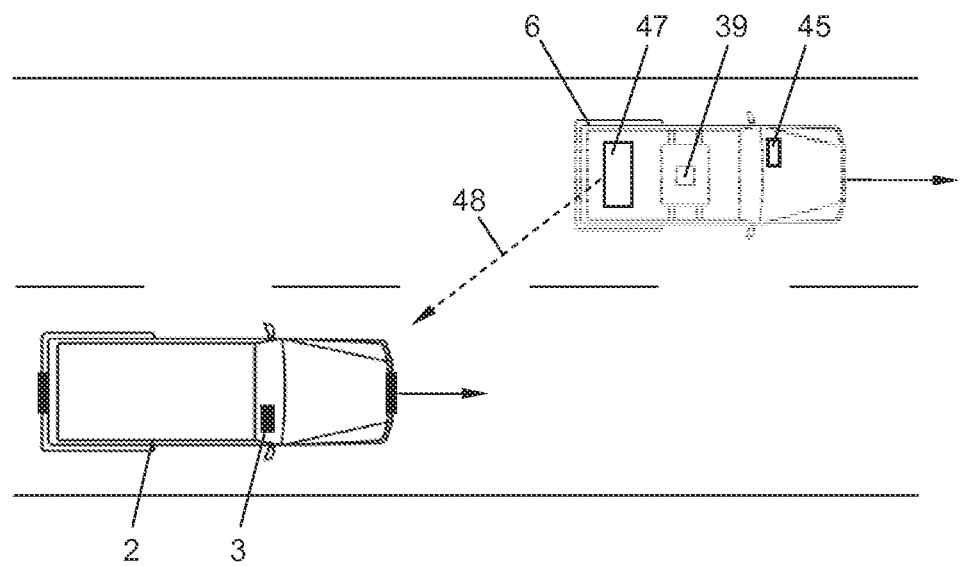
Figure 4:
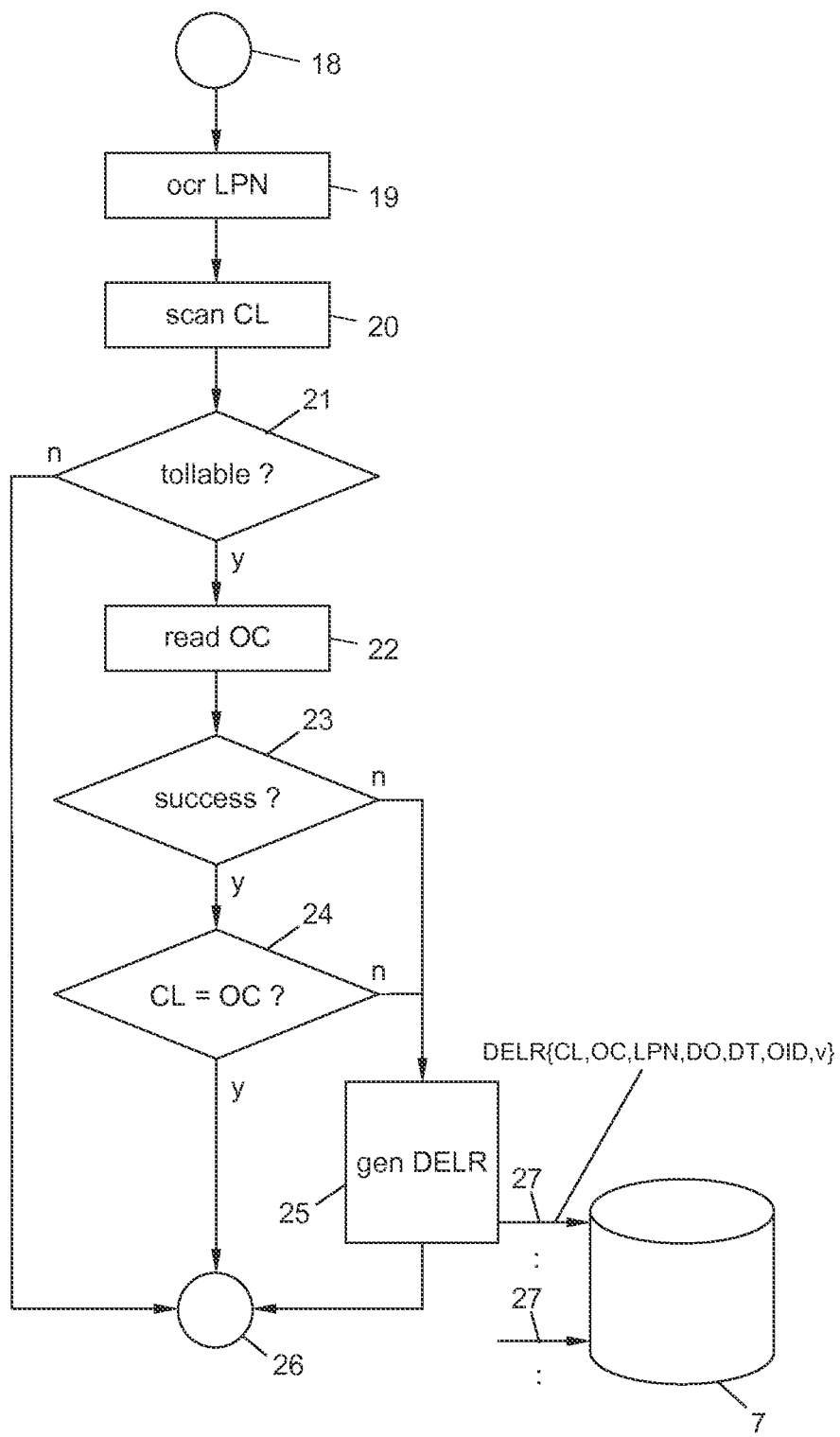
FIG. 4 is a flow chart of the part of the method that takes place in the recording vehicle.

As is shown in the overview in FIG. 1, the recording vehicles 5 are used to track down vehicles 2 that commit a traffic or toll violation, for example a speeding violation, or that contain a faulty or incorrectly set OBU 3, or none at all, in the respectively defined detection ranges, and transmit this information as a traffic or toll violation in form of a violation data record to the violation server 7; the interactions that take place for this purpose between the recording vehicle 5 and the vehicle 2 will be described in more detail hereafter based on FIGS. 2 and 4. The control vehicles 6 are used to check vehicles 2 that are located in the respective surroundings 9 with respect to the violation data records that are provided for these vehicles by the violation server 7 and to issue an alert message if a violation data record exists for a vehicle 2. The crew of the control vehicle 6 can then take the appropriate further verification and enforcement measures, for example stop the vehicle 2, conduct a traffic check, charge a subsequent toll, impose a fine and the like. The interactions that take place for this purpose between the control vehicle 6, the violation server 7 and the vehicle 2 will be described in more detail hereafter based on FIGS. 3 and 5.

The recording vehicles 5, the control vehicles 6, and the violation server 7 are connected to each other via a wireless network for this purpose, for example a mobile communication network, in particular a GSM, UMTS or LTE network, but also satellite-based mobile communication networks (for example iridium), and may be by packet-switched connections. As an alternative, the system may utilize a network of geographically distributed radio beacons in the road toll system 1, for example a DSRC beacon, via which the recording and control vehicles 5, 6 can communicate whenever a beacon passes.

Figure 2A:
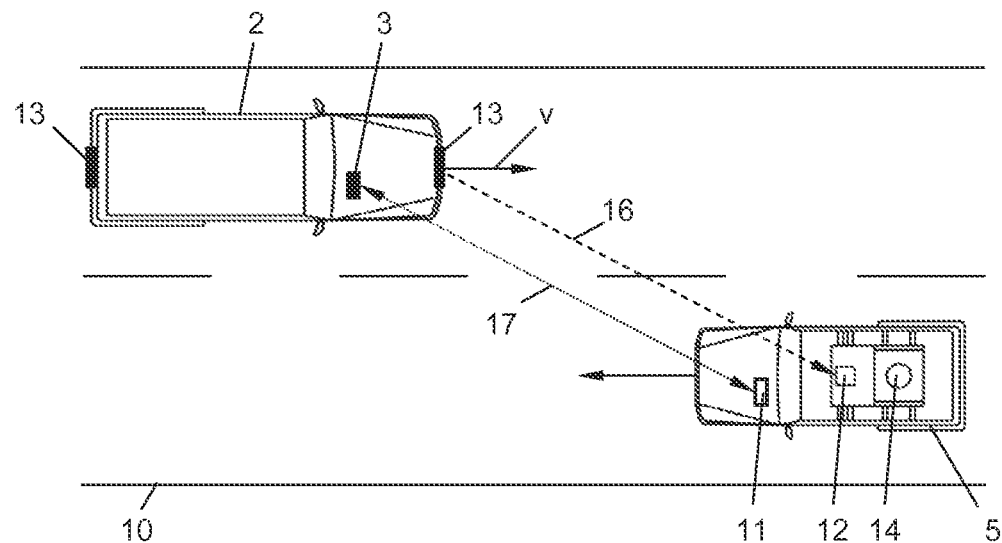
FIGS. 2a and 2b show different device components and method steps when a vehicle to be controlled passes a recording vehicle.
Figure 2B:
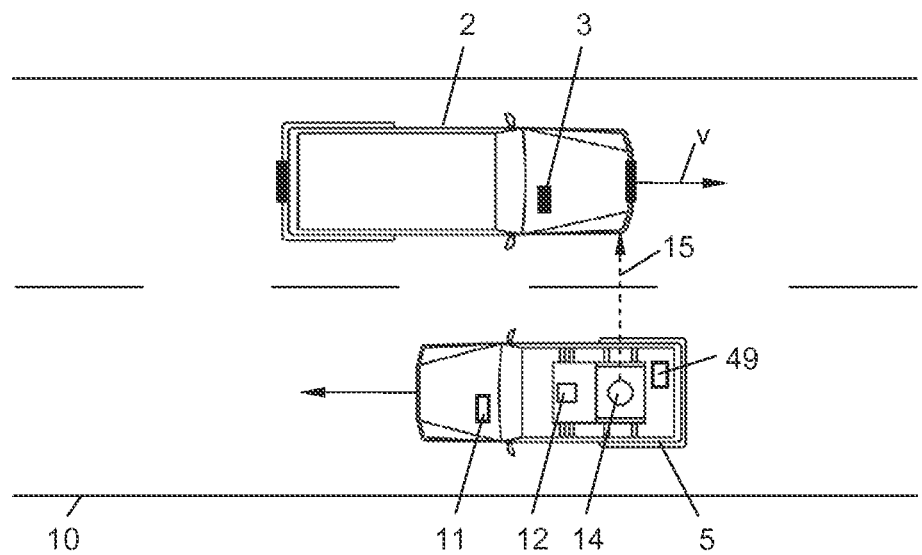

FIGS. 2a and 2b show one of the recording vehicles 5 in detail at two consecutive times as a vehicle 2 on a road 10 passes in opposing traffic. The recording vehicle 5 is equipped with a DSRC transceiver 11 for DSRC radio communication with the OBU 3 of the vehicle 2, a license plate number read unit 12 for automatically reading (optical character recognition, OCR) a license plate 13 of the vehicle 2, and a sensor 14, which here is a laser scanner, for detecting a parameter of the outside shape of the vehicle 2, which hereinafter is referred to as the shape parameter CL.

In the present example, the shape parameter CL is a vehicle class ("passenger car", "truck with two axles", "truck with three axles", "truck with four axles", "truck with trailer", and the like); however, of course any other property of the outside shape of the vehicle 2 which can be determined by way of the sensor 14 can serve as the shape parameter CL, similarly to the aforementioned vehicle shape-specific toll parameter OC.

The sensor 14 for detecting the shape parameter CL can be designed in any manner that is known from the prior art, for example in form of an electronic camera, which can record one or more images of the passing vehicle 2, including from different viewing angles, with these images then being used to extract corresponding properties and shape parameters of the vehicle 2 by means of image recognition software. As an alternative, the sensor 14 can be a radar or laser rangefinder or scanner, which scans the vehicle 2 as it passes using a radar or laser beam or fan 15' so as to detect one or more dimensions or contours of the passing vehicle 2 in form of a scanning profile of a scanning point cloud.

The license plate number read unit 12 of the recording vehicle 5 carries out an OCR read process known from the prior art of an official license plate number LPN on the license plate 13 of the vehicle 2 ("automatic license plate number recognition", ALNR); the imaging path or information flow is shown schematically with the arrow 16.

The DSRC transceiver 11 of the recording vehicle 5 establishes DSRC radio communication 17 with the OBU 3 so as to a) ascertain whether an OBU 3 is even present in the vehicle 3, b) thereby (implicitly) check whether the OBU 3 responds, which is to say functions correctly, and c) read out the toll parameter OC set or stored in the OBU 3 for the further examination. During this examination, the read-out toll parameter OC of the OBU 3 should be consistent with the shape parameter CL of the vehicle 2 detected by the sensor 14. For example, if the toll parameter OC indicates "three-axle truck", the sensor 14 should also detect a shape parameter CL that is consistent therewith; if not, a toll violation exists and the vehicle 2 is a "violating vehicle".

Of course, a toll parameter OC that is read out from the OBU 3 can additionally be dependent on components other than the vehicle shape, for example the status or usage purpose of the vehicle 2, the time, the general temporal conditions (for example night driving ban), vehicle emission class restrictions, speeds, and the like, which can likewise be taken into consideration when checking the violation.

All components, these being the DSCR transceiver 11, license plate number read unit 12, and sensor 14, of the recording vehicle 5 are connected to each other—via a controller in some embodiments (not shown)—and the recording vehicle 2 can, as described, communicate with the central violation server 7 wirelessly via a communication unit (not shown).

The operating principle of the recording vehicle 5 and the recording process that takes place when a vehicle 2 passes according to one embodiment will now be described in more detail with reference to FIGS. 2 and 4. When the vehicle 2 approaches the recording vehicle 5 (step 18), in a first step 19 the license plate number LPN of the vehicle 2 is read from the license plate 13 using a license plate number read unit 12 (arrow 16). The step 19 can also be carried out at any later time of the method of FIG. 4, as long as the license plate number read result LPN is not yet required, for example this can be done at a later time by reading the rear license plate 13 of the vehicle 2.

Subsequently, in a step 20, the shape parameter CL of the vehicle 2 is detected by way of the sensor 14, in the example shown this is done by laser scanning and detecting the number of axles of the vehicle 2, based on which an axle-based vehicle class ("class") is determined as the shape parameter CL.

In a subsequent decision step 21, it is checked based on the shape parameter CL whether or not the vehicle 2 is even subject to tolls. Two-axle vehicles 2, for example, can be defined as not being subject to tolls, and vehicles 2 with more than two axles can be defined as being subject to tolls. If the shape parameter CL indicates an obligation to pay tolls (branch "y"), in the subsequent step 22 contact is established with the OBU 3 using the DSRC transceiver 11 (arrow 17). The toll parameter OC is read out from the OBU 3 for this purpose, and a successful read-out also indicates that the OBU 3 is present and functioning. The subsequent decision step 23 then switches directly to step 25 for generating a violation data record DELR if the read-out fails (branch "n").

Otherwise (branch "y" of step 23), it is checked in the further decision 24 whether the detected shape parameter CL and the read-out toll parameter OC match or are consistent with each other, which is to say the toll parameter OC of the OBU 3 is set such that it corresponds to the shape parameter CL that has been detected based on the outside shape of the vehicle 2. If so (branch "y"), everything is fine and the method ends at 26. If not (branch "n"), an inconsistency exists, which constitutes a potential toll violation, and the process switches to step 25 for generating the violation data record DELR.

In step 25, the violation data record DELR is generated, which contains the detected shape parameter CL, the read-out toll parameter OC and the license plate number read result LPN, and in some embodiments may include other data such as the current location ("location of the violation") DO and the current time ("time of the violation") DT of the recording process, additional master data read out from the OBU 3 such as the OBU identifier OID, user master data, vehicle master data and the like.

The location of the violation DO can be determined in a wide variety of ways: The recording vehicle 5 can be equipped with a separate position determination unit, for example a satellite navigation receiver, and record the current location of the vehicle's passage as the location of the violation DO. As an alternative, the OBU 3, in particular if it is of the self-locating type, can make the current position thereof available to the recording vehicle 5 as the location of the violation DO. The known locations of neighboring radio beacons of a beacon-based road toll system 1 can also be used for approximation.

In the step 27, the violation data record DELR is then transmitted to the violation server 7 for further use by the control vehicles 6.

Of course steps 19 to 24—provided they do not require each other—can also be carried out in a different order.

The steps that take place in the violation server 7 and an exemplary control vehicle 6 will be described based on the embodiments of FIGS. 3 and 5. FIGS. 3a and 3b show the situation as a control vehicle 6 passes a vehicle 2 to be controlled at two consecutive times. In preparation for (or during) such a check, the violation server 7 selectively provides the control vehicles 6 with those violation data records DELR that originate from violations in the respective surroundings 9 thereof.

For this purpose, every control vehicle 6 registers with its own position LOC (or directly with the surroundings 9 thereof) in the violation server 7 during a registration phase 28. The current position LOC (or surroundings 9) of the control vehicle 6 can be autonomously determined by the same, for example, in a position determination step 29, such as with the aid of a satellite navigation receiver, based on information from neighboring beacons, or the like. As an alternative, the position LOC or the surroundings 9 can also be manually entered by the user in an input unit of the control vehicle 6 in step 29.

During the subsequent registration step 30, the control vehicle 6 registers with the position LOC (or surroundings 9) thereof in the violation server 7, which opens a dedicated task 31 for every registered control vehicle 6.

Using the task 31, the violation server 7 can "filter" (phase 32) all violation data records DELR that have arrived in step 27, and those that arrive thereafter, in a location-specific manner. For this purpose, the violation server checks whether the location of the violation DO of a violation data record DELR is within the surroundings 9 of the position LOC of a control vehicle 6, and if so, it makes this violation data record DELR available to this control vehicle 6 (step 33). The control vehicle 6 adds the violation data records DELR provided with in this way to a local violation data record list locDELR 34.

The provision of the violation data records DELR, which have been filtered in a location-specific manner, in step 33 can take place both continually, for example periodically or as needed, for example in that the violation server 7 transmits each individual violation data record DELR to the control vehicle 6, or in batches (using batch processing), in that the control vehicle 6 picks up the violation data records DELR that are provided at a particular time from the violation server 7, or receives them transmitted from the server.

In embodiments with the time of the violation DT, the violation data records DELR also bear a respective "time stamp", which can limit the temporal validity of the messages. For example, violation data records DELR that are "too old", which is to say those having time stamps DT that are outside a predetermined time period, can be automatically discarded, both in the violation server 7 and in the control vehicle 6, and/or the violation server 7 can make available only "current" violation data records DELR to a control vehicle 6, which is to say those having time stamps DT that are within a predetermined time period.

During the registration phase 28, the control vehicles 6 thus basically "subscribe to" violation data records DELR from the surroundings 9 thereof, until, in a step 35, they transmit a de-registration request to the violation server 7, whereupon the same deletes the task 31.

The control vehicles 6 are thus provided with the respective current and location-specific violation data records DELR from the surroundings 9 thereof and can, when a vehicle 2 passes or is checked, carry out control tasks 36 which utilize the respective local violation data record list 34.

Figure 5:
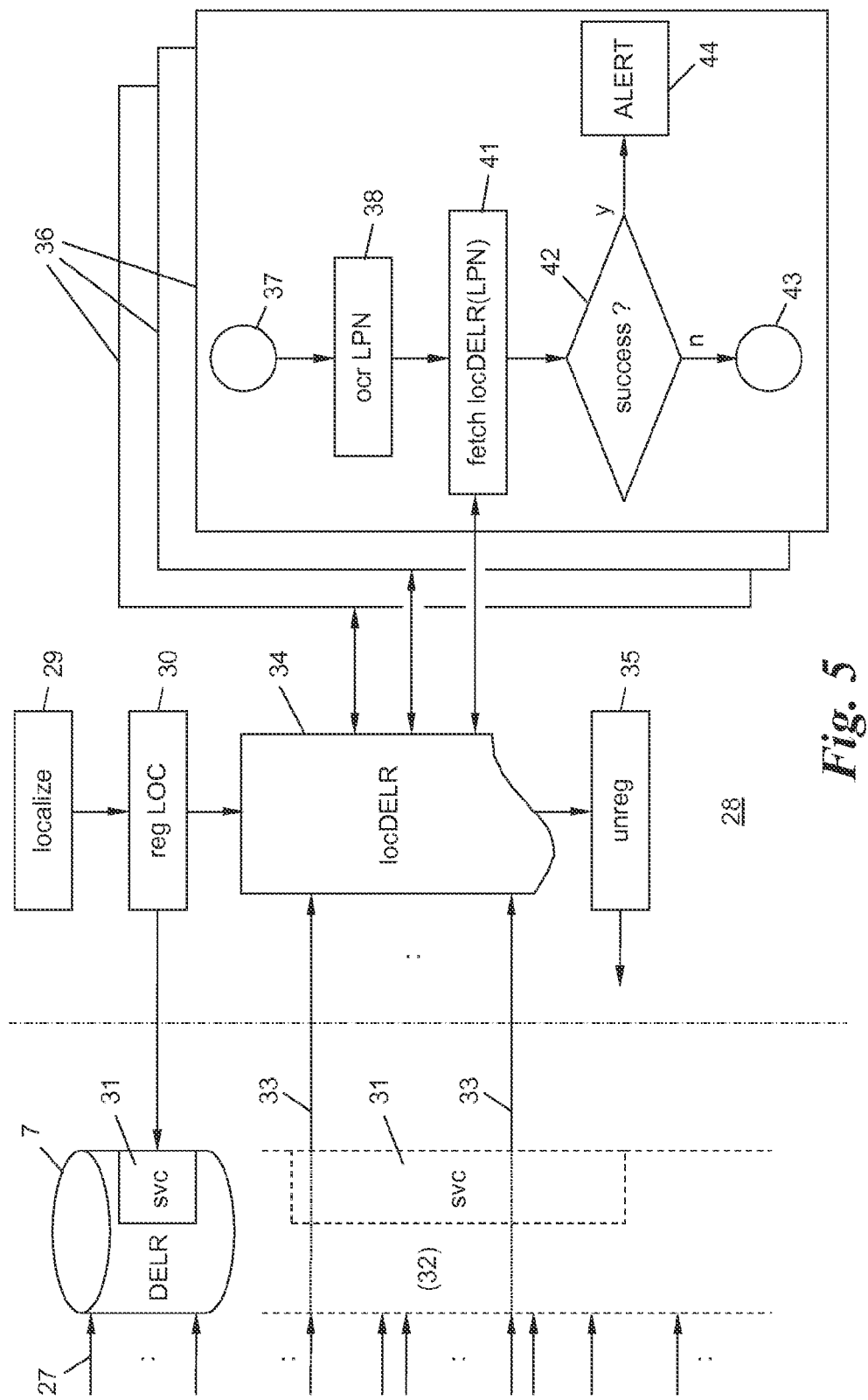
FIG. 5 is a flow chart of the parts of the method according to one embodiment that take place in the violation server and in the control vehicle.

According to FIGS. 3 and 5, during every control task 36, as a vehicle 2 approaches (step 37), the license plate number LPN is automatically read in a first step 38 from the license plate 13 using a license plate number read unit 39 of the control vehicle 6 (arrow 40). Subsequently, in step 41, the control vehicle 6 picks a matching violation data record DELR from the local violation data record list 34, provided such a record exists. If no violation data record DELR exists for the license plate number read result LPN (branch "n" in checking step 42), the task 36 ends at 43, and the license plate number read result LPN can be deleted again, for example for confidentiality reasons. However, if a violation data record DELR exists for the license plate number read result LPN (branch "y"), the process branches off to the alert step 44, in which the control vehicle 6 issues an alert message to the crew.

The alert message can, for example, be an optical or acoustic alert, or a display on a screen, which also indicates the read license plate number LPN and the violation data record DELR. The crew can then take appropriate enforcement measures, for example stop the vehicle 2, further check the OBU 3, and in some embodiments may levy a subsequent toll or impose a fine. The alert message can additionally be automatically displayed on a signaling unit 47 of the control vehicle 6 which is outwardly visible for the checked vehicle 2 (arrow 48), so as to prompt the same to stop, for example, using fluorescent lettering "STOP".

In some embodiments, in task 36 additionally the OBU 3 may also be again read out using the DSCR transceiver 45 of the control vehicle 6 (arrow 46), for example for further consistency checks or identifications.

The violation server 7 can, in some embodiments, be equipped with estimation algorithms, which carry out an estimation of the temporal changes of the locations of the violations DO (as the "last whereabouts" of the violating vehicles 2), based on speeds and driving directions of the vehicles 2 that were measured when the violation was recorded. To this end, the recording vehicle 5 can be equipped with a unit 49 for measuring the speed and the driving direction, which is to say the movement vector v, of a vehicle 2. The unit 49 can also be implemented by a license plate number read unit 12 which is designed as a video camera and in the images of which movements can be detected, or by a DSRC transceiver 11 designed as a Doppler radar, or by appropriate measurements using the sensor 14, for example laser or LIDAR measurements on the scanning beam or fan 15.

The speed measuring units 11, 12, 14, 49 of the recording vehicle 5 can moreover be used to detect general traffic violations of the vehicles 2, for example to detect speeding violations.

The movement vector v of the vehicle 2 at the time of the violation DT can be integrated in the violation data record DELR and transmitted to the violation server 7. The violation server 7 can then extrapolate or estimate potential new whereabouts DO of the vehicle 2 for later times, also with the support of road system maps of the road system, and take this into consideration during phase 32 for those times at which the violation data records DELR that are relevant for the surroundings 9 of a control vehicle 6 are selected. Violation data records DELR of vehicles 2, the locations of violations DO of which were formerly outside the surroundings 9 of the position LOC of a control vehicle 6, can thus be within the surroundings 9 at a later time—on an extrapolated basis—and thus be made available to this control vehicle 6, or to the local violation data record list 34 thereof.

The surroundings 9 of the control vehicles 6 are thus dynamically adapted in terms of time. In addition, the surroundings 9 can be specifically adapted to the circumstances of the road system in which the control vehicle 6 moves about, so as to also take the movement of the same into consideration: The surroundings 9 are then no longer circles (as shown schematically in FIG. 1), but are dynamically adapted in accordance with the own movements of a control vehicle 6 and the options of the same to make turns in the road system, for example they are adapted in an elliptic or tree-shaped manner, so as to always obtain the selection of those violation data records DELR from the violation server 7, and add to the local violation data record list locDELR 34, which have the highest likelihood that the control vehicle 6 will encounter these violating vehicles 2 during the movement of the control vehicle. As an alternative, any arbitrary shapes of surroundings 9 can be predetermined.

The invention is thus not limited to the shown embodiments, but encompasses all variants and modifications that are covered by the scope of the accompanying claims.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the systems may be implemented using a general purpose or dedicated processor device running a software application or program code stored in volatile or non-volatile memory devices. Devices so programmed may be used to perform the methods described herein. Also, the hardware objects could communicate using electrical signals, with states of the signals representing different data.

It should be further understood that these and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

The invention claimed is:

1. A control system for a road toll system that is based on on-board units carried by monitored vehicles, comprising:
    at least one recording vehicle and a plurality of control vehicles, which each recording vehicle and each control vehicle comprises a read unit for automatically reading the license plate number of a license plate of a monitored vehicle and are wirelessly connected to a central violation server,
    wherein the at least one recording vehicle and the plurality of control vehicles are different vehicles, a recording vehicle does not function as a control vehicle, and a control vehicle does not function as a recording vehicle,
    wherein the at least one recording vehicle is configured to determine a traffic or toll violation of an on-board unit, or of the monitored vehicle carrying the same, and, if a violation exists, to transmit a violation data record, including the location of the violation and the license plate number read result of the monitored vehicle, to the central violation server,
    wherein the central violation server is configured to register the plurality of control vehicles, including the positions or the surroundings thereof, and to provide violation data records determined by the at least one recording vehicle, the locations of the violations of which are in the surroundings of a position, to a control vehicle that is registered with this position or these surroundings, and
    wherein at least one control vehicle of the plurality of control vehicles is configured to register the position or surroundings thereof in the central violation server and to determine a violation data record that has been provided by the central violation server for a read license plate number and, if such a record exists, to issue an alert message.

2. The control system according to claim 1 for a road toll system comprising on-board units, from which at least one vehicle shape-specific toll parameter can be read out via a DSRC (dedicated short range communication) radio interface, wherein the at least one recording vehicle comprises a DSRC transceiver configured to read out the toll parameter of a monitored vehicle as it passes and a sensor configured for detecting a shape parameter of the monitored vehicle,
    wherein the at least one recording vehicle is configured to check the toll parameter for consistency with the shape parameter and, in case of inconsistency, to transmit the violation data record, including the location of the violation and license plate number read result of the monitored vehicle, to the central violation server.

3. The control system according to claim 1, wherein the at least one recording vehicle is equipped with a unit configured to measure the speed of the monitored vehicle as it passes so as to determine the traffic or toll violation also based on these measured values.

4. The control system according to claim 1, further comprising a first plurality of recording vehicles and a second plurality of control vehicles, wherein the second plurality is greater than the first by at least one power of ten.

5. The control system according to claim 2, wherein the shape parameter and the toll parameter are a respective vehicle length or a respective number of vehicle axles.

6. The control system according to claim 2, wherein the sensor is a laser rangefinder or laser scanner configured to detect at least a portion of the shape of the monitored vehicle by scanning as it passes and to generate at least one shape parameter therefrom.

7. The control system according to claim 1, wherein the violation data record also contains a time stamp, and the central violation server is configured to take only violation data records into consideration that are within a predetermined time period.

8. The control system according to claim 1, wherein the at least one recording vehicle is equipped with a unit configured to measure the speed and driving direction of a monitored vehicle as it passes and to add these measured values to the violation data record, and the central violation server is configured to extrapolate a temporal change of the location of the violation based on the aforementioned measurement values so as to take this into consideration when checking whether a location of a violation is within the surroundings of a position at a particular time.

9. A recording vehicle for a road toll system, comprising:
a communication unit for wirelessly communicating with a central violation server,
a DSRC (dedicated short range communication) transceiver for reading out a vehicle shape-specific toll parameter of a passing vehicle,
a sensor for detecting a shape parameter of the passing vehicle, and
a read unit for reading the license plate number of a license plate of the passing vehicle,
wherein the recording vehicle is configured to check the toll parameter for consistency with the shape parameter and, in case of inconsistency, to determine and transmit a violation data record, including the location of the violation and the license plate number read result of the passing vehicle, to the central violation server for transmission to a control vehicle at the position or the surroundings thereof from among a plurality of control vehicles that enforces the violation,
wherein the recording vehicle and the plurality of control vehicles are different vehicles, a recording vehicle does not function as a control vehicle, and a control vehicle does not function as a recording vehicle.

10. The recording vehicle according to claim 9, wherein the sensor is a laser scanner, which is configured to detect at least a portion of the shape of the passing vehicle by scanning as it passes and generates at least one shape parameter therefrom.

11. The recording vehicle according to claim 9, wherein it is equipped with a unit for determining the location of the violation.

12. The recording vehicle according to claim 9, wherein it is equipped with a unit configured to measure at least one of the speed and the driving direction of the passing vehicle and to add this/these measured value(s) to the violation data record.

13. A violation server for a road toll system comprising:
a communication unit for wirelessly communicating with recording vehicles and control vehicles,
wherein the recording vehicles and the control vehicles are different vehicles, a recording vehicle does not function as a control vehicle, a control vehicle does not function as a recording vehicle, and
wherein the violation server is configured to:
receive violation data records and corresponding license plate numbers from the recording vehicles configured to determine a violation of a monitored vehicle based on an automatically detected shape parameter and automatically received toll parameter from an on-board unit of the monitored vehicle,
store the received violation data records,
register the control vehicles, including the positions or the surroundings thereof, and
provide the violation data records and the corresponding license plate numbers, the locations of the violations of which are within the surroundings of a position, to a control vehicle from among the control vehicles that is registered with this position or these surroundings.

14. The violation server according to claim 13, wherein the violation data record also contains a time stamp, and the violation server is configured to take only violation data records into consideration that are within a predetermined time period.

15. The violation server according to claim 13, wherein the violation data record also contains measured values regarding the speed and driving direction, and the violation server is configured to extrapolate a temporal change of the location of the violation based on the aforementioned measured values so as to take these into consideration when checking whether a location of a violation is within the surroundings of a position at a particular time.

16. A control vehicle for a road toll system comprising:
a communication unit for wirelessly communicating with a central violation server,
a unit for registering the control vehicle position or surroundings thereof in the central violation server, and
a read unit for reading the license plate number of a license plate of a passing vehicle,
a unit for receiving violation data records and corresponding monitored vehicle license plate numbers from the central violation server, the locations of the violations of which are at the position or within the surroundings of the position of the control vehicle,
wherein the received violation data records and corresponding license plate numbers have been transmitted to the central violation server from one or more recording vehicles which determine a violation based on an automatically detected shape parameter and automatically received toll parameter from an on-board unit of a monitored vehicle,
wherein the control vehicle is configured to determine if a corresponding monitored vehicle license plate number for a violation data record generated by a recording vehicle and that has been provided by the central violation server also corresponds to the license plate number read from the license plate of the passing vehicle, and if correspondence exists, to issue an alert message, and
wherein the control vehicle and the recording vehicle are different vehicles, the recording vehicle does not function as a control vehicle, and the control vehicle does not function as a recording vehicle.

17. The control vehicle according to claim 16, wherein the violation data record also contains a time stamp, and the control vehicle is configured to discard violation data records that are outside a predetermined time period.

18. The control vehicle according to claim 16, wherein it is equipped with a unit configured to determine the position thereof so as to register the position in the central violation server.

19. A control method for a road toll system which is based on onboard units carried by monitored vehicles, using at least one recording vehicle and a plurality of control vehicle vehicles, which can wirelessly communicate with a central violation server, the method comprising:
in the at least one recording vehicle:

determining a traffic or toll violation of an on-board unit, or of a monitored vehicle carrying the same, and if a violation exists, transmitting a violation data record, containing a determined location of the violation and a read license plate number of the monitored vehicle, to the central violation server;

in the central violation server:

registering the plurality of control vehicles, including positions or the surroundings thereof, receiving violation data records from the at least one recording vehicle and, if the locations of the violations thereof are within the surroundings of a position, providing these violation data records to a control vehicle from among the control vehicles that are registered with this position or these surroundings;

in each of the plurality of control vehicles:

registering the position or surroundings thereof in the central violation server, reading the license plate number of a passing vehicle, determining a violation data record determined by the at least one recording vehicle and provided by the central violation server for the read license plate number and, if such a record exists, issuing an alert message, wherein the at least one recording vehicle and the plurality of control vehicles are different vehicles, a recording vehicle does not function as a control vehicle, and a control vehicle does not function as a recording vehicle.

20. The control method according to claim 19 for a road toll system comprising vehicles equipped with on-board units, from which at least one vehicle shape-specific toll parameter can be read out via a DSRC (dedicated short range communication) radio interface, further comprising: in the at least one recording vehicle:

reading out the toll parameter of the monitored vehicle as it passes by means of a DSRC transceiver, detecting a shape parameter of the monitored vehicle as it passes by means of a sensor, checking the toll parameter for consistency with the shape parameter and, in case of inconsistency, transmitting a violation data record, including the location of the violation and license plate number read result of the passing vehicle, to the central violation server.

21. The method according to claim 19, wherein at least one of the speed or the driving direction of the monitored vehicle is/are measured in the at least one recording vehicle and the traffic or toll violation is also determined as it passes based on this/these measured value(s).

22. The method according to claim 19, wherein the shape parameter and the toll parameter are a respective vehicle length or a respective number of vehicle axles.

23. The method according to claim 19, wherein the violation data record also contains a time stamp, and the central violation server only takes violation data records into consideration containing time stamps within a predetermined time period and/or the plurality of control vehicle discards violation data records containing time stamps outside a predetermined time period.

24. The method according to claim 19, wherein the at least one recording vehicle measures the speed, and preferably the driving direction, of a passing vehicle and adds these to the violation data record, and based thereon the central violation server extrapolates a temporal change of the location of the violation, so as to take this into consideration when checking whether a location of a violation is within the surroundings of a position at a particular time.

* * * * *

UNITED STATES PATENT AND TRADEMARK OFFICE
CERTIFICATE OF CORRECTION

PATENT NO. : 9,286,628 B2
APPLICATION NO. : 13/757514
DATED : March 15, 2016
INVENTOR(S) : Alexander Leopold et al.

It is certified that error appears in the above-identified patent and that said Letters Patent is hereby corrected as shown below:

In the claims,

In column 14, line 63, in claim 19, delete "onboard" and insert -- on-board --, therefor.

In column 14, line 64, in claim 19, after "control" delete "vehicle".

In column 15, line 15, in claim 19, after "that" delete "are" and insert -- is --, therefor.

Signed and Sealed this
Twenty-first Day of June, 2016

Michelle K. Lee
*Director of the United States Patent and Trademark Office*